United States Patent [19]

McKnight

[11] 4,174,582

[45] Nov. 20, 1979

[54] COMMERCIAL FISHING NET ASSEMBLY WITH A PORPOISE ESCAPE ZONE

[76] Inventor: John R. McKnight, 5087 Park West Ave., San Diego, Calif. 92114

[21] Appl. No.: 876,538

[22] Filed: Feb. 9, 1978

[51] Int. Cl.² .............................................. A01K 73/12
[52] U.S. Cl. .......................................... 43/14; 43/106
[58] Field of Search ................... 43/7, 8, 14, 100, 106

[56] References Cited

U.S. PATENT DOCUMENTS

| 2,549,475 | 4/1951 | Jardim | 43/7 X |
| 3,830,004 | 8/1974 | Poirot | 43/14 |
| 3,849,927 | 11/1974 | Gonsalves | 43/14 |
| 4,006,549 | 2/1977 | Seabrooke | 43/14 |

FOREIGN PATENT DOCUMENTS

| 1215206 | 4/1960 | France | 43/14 |
| 171683 | 2/1964 | U.S.S.R. | 43/14 |

OTHER PUBLICATIONS

U.S. Department of Commerce National Marine Fisheries Service, Cruise Report, M/V Westport, Sep. 1971.

Primary Examiner—Nicholas P. Godici

[57] ABSTRACT

A commercial fishing net takes advantage of animal psychology to easily permit the escape of entrapped porpoises while preventing the escape of desired tuna and other edible fish, the net having at least a portion comprising a drop net which sinks beneath the water surface to a depth defined by tethered floats when a control bladder attached to the top of the drop net is deflated, there also being an optional stiffener hose extending along the top of the drop net and being filled with a releasable pressurized fluid to maintain the upper edge of the drop net aligned and prevent the bunching of this net portion.

4 Claims, 6 Drawing Figures

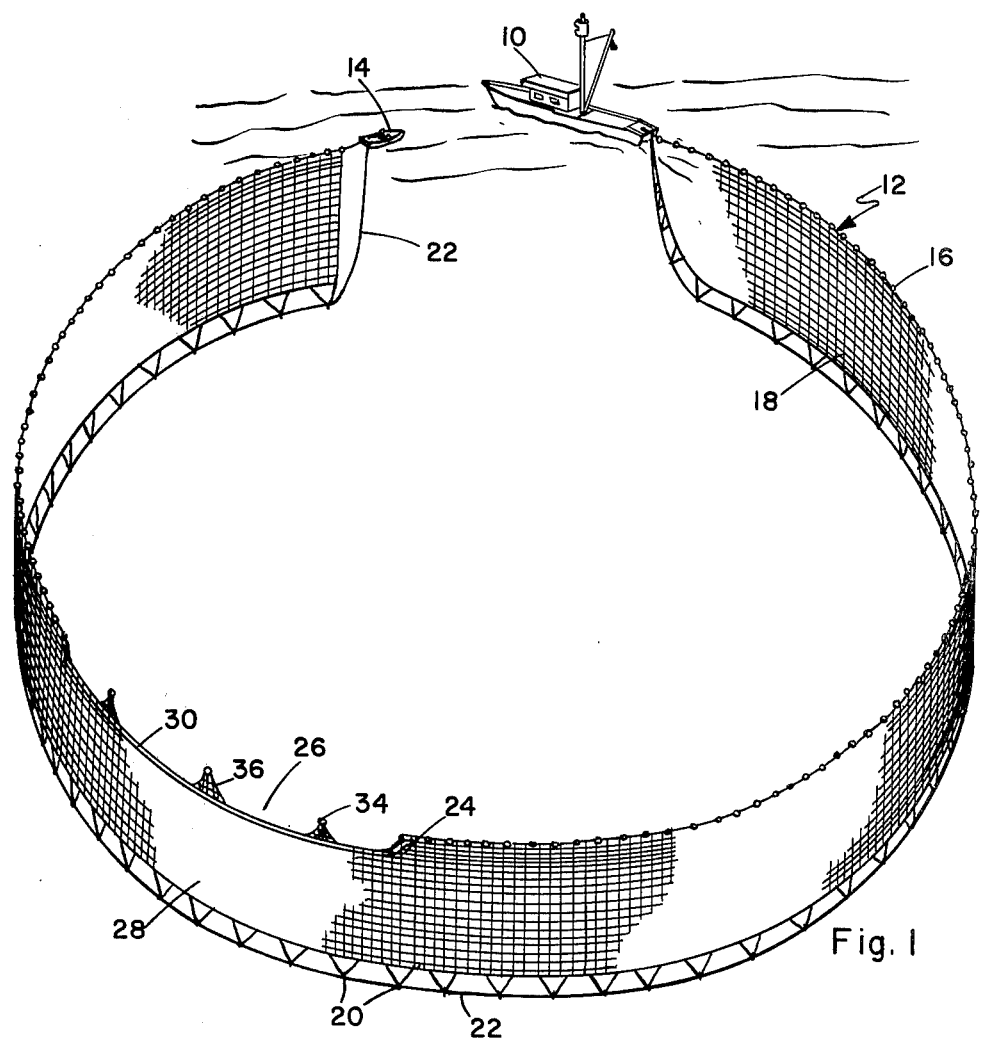
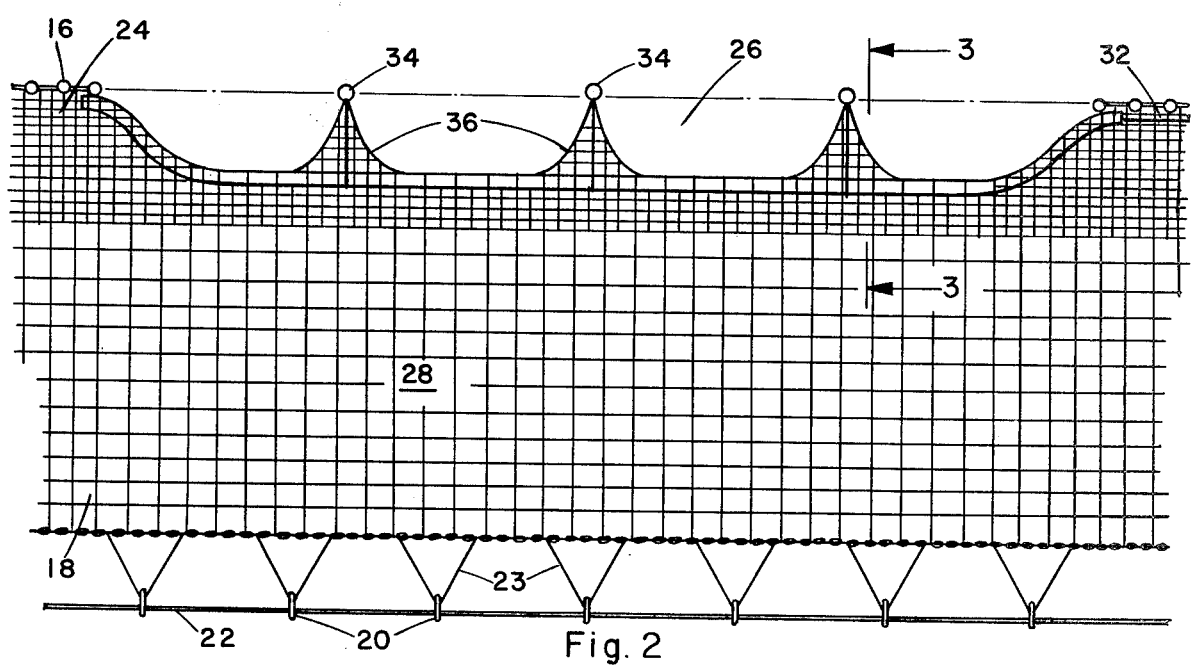

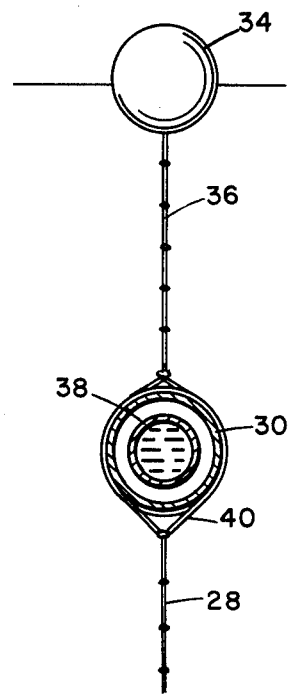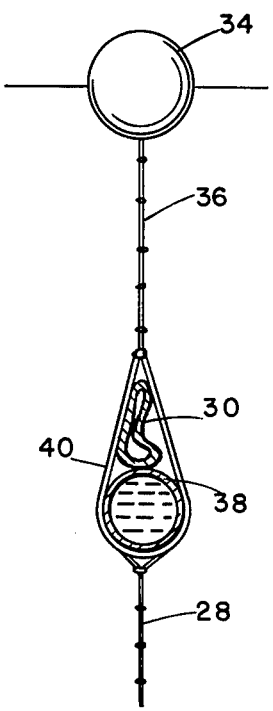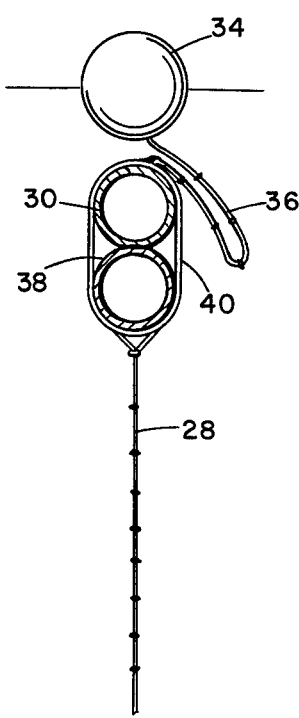
Fig. 3          Fig. 4          Fig. 5
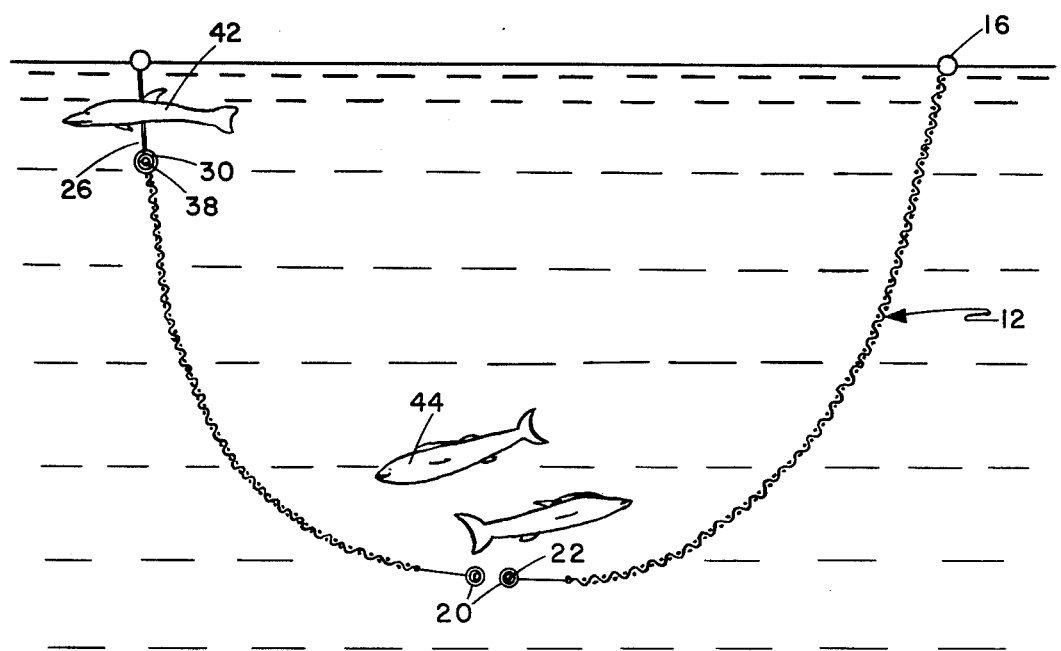
Fig. 6

COMMERCIAL FISHING NET ASSEMBLY WITH A PORPOISE ESCAPE ZONE

BACKGROUND OF THE INVENTION

The invention is in the field of tuna siening nets which are designed to permit the escape of porpoises.

Present day tuna fishing techniques involve the use of a long net which is deployed by a boat called a "Siener". The net is extended in the water and the bottom weighted and the top edge floated so that it extends vertically downward from the water surface. The net is first deployed generally around a school of tuna and is drawn around to define an enclosure. The tuna ordinarily remain at a depth somewhat below the water surface and once the net is drawn completely around them the bottom edge of the net is drawn together or "pursed", and thus the nets are called "purse nets".

Once the net is pursed, there is no escape for the fish contained inside. Because porpoises are inclined to swim above a school of tuna, they are used as fish spotters and thus are often trapped in the nets as they are pursed closed. As the net is drawn tighter these mammals, in their frenzy to escape, will charge the net with such force that they will become trapped in the net fabric. Because the porpoises remain generally close to the water surface because they are air breathers, a net using a very fine mesh upper band has been devised and is quite effective in preventing the porpoises from becoming stuck in the net as a result of their charging.

Unfortunately, even though the porpoises are quite agile at jumping from the water and could easily jump over the cork line which floats the net if they tried, they are for some reason afraid to do this and instead will charge the net.

Current porpoise freeing techniques involve the use of a skiff, which the fisherman will take to a point along the net generally remote from the siener and then with a long pole or gaff will force portions of the net beneath the surface to permit porpoises to swim to their freedom. Another technique is to "back down" the siener which involves tugging the entire net through the water such that the rearmost portion dips beneath the surface. Occasionally, the fishermen have even been known to jump into the water and manually throw the porpoises over the net or through the depressed portion they have made in the net. This is somewhat time consuming and clearly it has not been completely effective or the current battle between the environmentalists and the fishermen, which has resulted in a crippling of the industry, would not have taken place.

Whereas the porpoise problem has spawned the development of a number of inventions designed toward providing a solution, nothing has been developed which is simple in terms of initial costs and operating man power, and at the same time is effective. The prior art also includes a net which operates on a principle similar to application's invention and is represented in U.S. Pat. No. 3,830,004. This device is a net which has an inflatable upper hose which can be kinked at various places with a long gaff to permit the deflation of certain portions, causing areas of the net to sink below the surface to permit the ingress of fish in response to the placement of bait within the net area. This is similar in principle to one of the features of applicant's invention.

SUMMARY OF INVENTION

Application provides a standard purse net which is modified to provide at least a portion, although it could be the entire net, with a "drop net" which is controlled by an inflatable and deflatable bladder to drop beneath the water surface and define a porpose escape zone. The depth to which the drop net sinks is controlled by one or more floats tethered to the top of the drop net but not connected one to the other, so that completely open gaps occur above the drop net zone to provide a clear escape zone for the porpoises.

The bladder, which in the preferred embodiment takes the form of a hose extending along the upper edge of the drop net, can be quickly filled to raise this portion of the net in case tuna begin escaping through the porpoise escape zone, and automatic raising of the drop net would ordinarily take place when the area is free of all porpoises.

A stiffener hose, filled with pressurized fluid may be attached to the top of the drop net to provide a certain rigidity in the net and prevent the bunching of the drop net as it sinks below the level of the other net portions. If the width of a particular drop net portion were not too great, the stiffener could be used in place of the floats to prevent the drop net from sinking too far.

BRIEF DESCRIPTION OF THE DRAWINGS

FIG. 1 illustrates a typical siening operation near the completion of a set and showing the modified net;

FIG. 2 is an enlarged view of the modified portion of the net;

FIG. 3 is an enlarged sectional view taken on line 3—3 of FIG. 2, showing the concentric stiffener and buoyancy hoses;

FIG. 4 is a similar sectional view, but showing separate hoses

FIG. 5 is a sectional view similar to FIG. 4, with the buoyancy hose inflated to close the gap in the net; and FIG. 6 is a typical cross section of the net in pursed condition, showing the action of the tuna and porpoise.

DETAILED DESCRIPTION OF THE PREFERRED EMBODIMENT

FIG. 1 shows the net apparatus of the present invention as it would be seen in use surrounding a school of tuna. The tuna siener 10 deploys the net member 12 off the stern and a skiff 14 draws the net into a circle, surrounding the school of tuna.

The net member 12 ordinarily would have a cork line 16 at the upper edge with the depending recticulated grid of material 18 terminating at the bottom in a line of purse rings 20 which are drawn together at the proper time by a purse line 22. The purse rings are fastened to the bottom of the net by reason of bladder 23.

Currently the nets are being provided with a fine mesh upper band 24 to avoid the entrapment of porpoises in the fabric of the net if they charge same in a fit of fear.

Applicant's development involves an adaptation of the existing net as described above to permit the lowering and subsequent raising of at least a portion of the upper edge of the net member 12 from a control position which could be on the siener itself, or on the skiff. The skiff could be adjacent the area to be lowered, or remote, depending on the arrangement desired.

The preferred embodiment illustrates a single escape zone 26, although more than one could be provided or the entire net modified along its upper edge to permit the escape of porpoises in any direction.

This escape zone is defined by a drop net 28 which is similar to the other portions of the net member 12 except that along its upper edge is an inflatable bladder, which takes the form of a hose 30 in the preferred embodiment. As can be seen in FIG. 2, a pressure line 32 is connected to the inflatable hose or bladder 30. This pressure line could terminate in a valve fitting right adjacent the drop zone to be controlled by a compressor on board the skiff 14, or it can extend along the upper portion of the net to the siener and be controlled from that position.

In order to create the escape zone 26, the air is permitted to dissipate from the inflatable hose, which may be somewhat elastic to promote the quick escape of air.

When this happens, the upper edge of the net sinks to the position shown in the drawings. Depending upon the exact nature of the net used, ordinarily the bottom edge of the net would sink below the level of the adjacent portions of the net member, although in FIG. 2 a slightly modified form of the net is shown in which the bottom edge is aligned with adjacent net member portions when the top has been dropped.

In order to define a specific depth to which the drop net will drop a plurality of floats 34 may be spaced from the upper edge of the drop net by means of web-like tether members 36. Although the net could be made to function without these spaced floats, it is intended that the floats, by maintaining the upper edge of the drop net at a uniform level, will prevent the portions of the net member 12 from being pulled together and bunching as the drop net sinks, as it would likely do if the floats 34 were not used. Thus the drop zone is actually divided into several sub-zones, each of which is completely clear as the floats 34 are not connected together directly by any line or cable. The porpoises therefore would ordinarily be expected to move freely through the escape zone, evacuating the enclosed net area.

A second, stiffener hose 38 may be provided. This hose has a pressurized fluid, for example sea water, inside which gives it its stiffening capabilities. By the use of this second hose it may be possible to omit the floats 34. The purpose of this exchange would be to make the escape zone even more attractive to porpoises because there would not even be the spaced floats 34 to deter them from the escape zone area.

As is shown in FIG. 3, the second stiffener hose 38 could actually be disposed inside the buoyancy hose 30 so that only one hose need be handled by the net handling equipment on the siener.

FIG. 4 shows the stiffener hose together with the buoyancy hose in the down and the up position. In the embodiment shown in those figures, the hoses are adjacent rather than concentric and encased in a common sheath 40.

As a slight modification of the mode of operation of the apparatus, the inflatable hose 30 could be filled with water to force out the air, rather than the air being valved and the evacuation of the air depending on hose wall tension and water pressure.

The general concept of the invention is clearly to provide at least a portion of the upper edge of the net with means for lowering same and subsequently raising same after the porpoises have been evacuated. As has been mentioned above, the structure to implement this aim could be included in the entire perimeter of the net giving the porpoises 360° of freedom in their choice of an escapement route. Another alternative is to provide two or more small escape zones similar to that shown needed to operate simultaneously from the same location, or to be operated independently by skiffs either simultaneously or independently.

The operation of the net is illustrated rather diagrammatically in FIG. 6 wherein a porpoise 42 escapes through the escape zone 26 while the tuna 44, who are inclined to stay deeper in the water, are unaware that there is an escape zone available for their use. The siener could be used to back down the net in conjunction with use of the instant invention to maximize the escape of porpoises and simultaneously minimize the loss of tuna.

It is intended that any net apparatus which operates in a similar fashion permit the dipping from a remote location of one or more portions of the upper edge of the net, effected remotely by means of operating a variable buoyancy member, falls within the scope of the invention as set forth in the appended claims.

I claim:

1. A fish net assembly comprising:
   (a) an elongated reticulated net member balanced to be vertically depoyed in the water;
   (b) at least a portion of said net member defining a drop net which defines a porpoise escape zone, and including an inflatable hose secured to the upper edge thereof and remote control means for selectively inflating and deflating said hose to selectively raise and lower said drop net in the water between a position on the water surface and a submerged position at a controlled, pre-selected depth beneath the surface; and
   (c) a plurality of floats longitudinally spaced along said hose and connected and spaced vertically from said hose by individual tethers of substantially uniform length, said buoys being discreet and freestanding aside from said tether connections to thus define a plurality of completely free spaces at the water surface bordered along the sides by consecutive buoy pairs and their respective tethers, and along the bottom by said hose.

2. Structure according to claim 1 and including a second hose connected to the upper edge of said drop net, said second hose being filled with a compressed fluid and acting as a stiffener to span the length of said drop net and prevent said drop net from puckering and bunching between floats.

3. Structure according to claim 2 wherein said second hose is of smaller diameter than said first hose and is disposed inside said second hose.

4. Structure according to claim 2 wherein said second hose has a pressurized fluid release mechanism to permit the evacuation of said hose for hauling said hose aboardship and for purposes of storage.

* * * * *